US005666405A

United States Patent [19]

Weber

[11] Patent Number: 5,666,405
[45] Date of Patent: Sep. 9, 1997

[54] TRUE FAMILY TELECOMMUNICATION SERVICE

[75] Inventor: Roy Philip Weber, Bridgewater, N.J.

[73] Assignee: AT&T, Middletown, N.J.

[21] Appl. No.: 502,783

[22] Filed: Jul. 14, 1995

[51] Int. Cl.$^6$ .................. H04M 11/00; H04M 15/06; H04M 17/00; H04M 3/00
[52] U.S. Cl. .................. 379/127; 379/114; 379/142; 379/144; 379/196; 379/93.02
[58] Field of Search .................. 379/111–115, 127, 379/133, 134, 136, 142, 144, 145, 207, 211, 212, 188, 189, 196, 197, 199, 201, 91, 95

[56] References Cited

U.S. PATENT DOCUMENTS

| | | | |
|---|---|---|---|
| 4,748,653 | 5/1988 | Kerr | 379/32 |
| 4,893,330 | 1/1990 | Franco | 379/145 |
| 5,222,120 | 6/1993 | McLeod | 379/207 |
| 5,239,577 | 8/1993 | Bates | 379/211 |
| 5,287,403 | 2/1994 | Atkins | 379/144 |
| 5,335,266 | 8/1994 | Richardson | 379/112 |
| 5,365,580 | 11/1994 | Morisaki | 379/189 |
| 5,369,685 | 11/1994 | Kero | 379/213 |
| 5,438,616 | 8/1995 | Peoples | 379/201 |
| 5,450,479 | 9/1995 | Alesio | 379/144 |
| 5,469,497 | 11/1995 | Pierce | 379/144 |
| 5,479,494 | 12/1995 | Clitherow | 379/144 |
| 5,487,107 | 1/1996 | Atkins | 379/112 |
| 5,502,759 | 3/1996 | Cheng et al. | 379/201 |

Primary Examiner—Curtis Kuntz
Assistant Examiner—Vijay Shankar
Attorney, Agent, or Firm—Henry T. Brendzel

[57] ABSTRACT

Entities who normally are financially responsible for calls made by them have their calls paid for by a sponsor when they are selected by the sponsor to be included in a "family ring" and they make calls to other entities that are included by the sponsor in the family ring. This capability is achieved with the aid of a database node which maintains information about the identity of members in the family ring. Operationally, in accordance with one embodiment, any member of the family ring who wishes to call another member of the family ring calls a pre-designated number that connects the calling party to a database node. The database node interacts with the calling party by first determining whether the calling party is a member of the family ring, and when the calling party is authenticated, the database node responds to information that identifies a selected called party who is also a member of the family ring. The database node performs a translation, as necessary, and informs the telecommunication network of the destination desired by the calling party. In response, the telecommunication network connects the calling party to the called party.

24 Claims, 2 Drawing Sheets

TRUE FAMILY TELECOMMUNICATION SERVICE

BACKGROUND OF THE INVENTION

1. Field of the Invention

This invention relates to telephone service where other than the calling party pays the charge for telephone calls.

2. Description of Prior Art

Today's typical family is more dispersed than ever. Sometimes even a nuclear family is dispersed, such as when the children grow up and go to college. Often, the head of the family desires for the family members to keep in as close contact as possible, and telecommunication is certainly one avenue. It is not uncommon for a parent to say "call me collect, anytime", and some have even given their children a telephone calling card for just such a purpose. A calling card allows the holder to not only call the parent, effectively "collect", but also allows calling a sibling, with the parent paying the charges for the call. Alas, a calling card can be also abused by calling people who are outside the set of people contemplated by the parent, and it also can be lost or stolen.

In a different context, years ago I have invented the "800 service", where a telephone subscriber, perhaps a service supplier such as an insurance company, can elect to pay for all incoming calls, in contradistinction to normal practice. In implementing this service, the customer is assigned a number within a pseudo area code "800". Whoever dials that number is connected to a database node which translates the 800 number to the actual number of the customer and, thereafter, the call is transferred, or rerouted, to the customer's number. The 800 area code designation provides an easy means for the local telephone company to know that the calling party is not to be charged for the call.

Building on this capability, a system now exists that allows redirection of incoming calls. In operation, the "800 number" call is coupled to a system that prompts the user for redirection information, and when that is provided, the database in the system performs the necessary translation and the call is rerouted accordingly. All of these numbers to which calls are rerouted are associated with a single customer. They are the customer's phones, which happen to be in different locations. All charges associated with those phones are that customer's responsibility.

This capability is useful for a customer who is a commercial establishment that desires any and all people to call it. While it offers the notion of someone other than the calling party paying for the call, it does not provide the capabilities necessary for solving the above-described problem where a party wishes to encourage calls among a select set of people and is willing to accept the charges, but only for such calls.

Another conventional arrangement where a number (or even many) telecommunication end points can call each other but the charges are paid for by a single sponsor is a network of locations owned by a single company. Typically each location is serviced by a PBX and calls made from such telecommunication end points are paid for by the company. Of course, in a very real sense all of those telecommunication end points belong to a single subscriber, and all calls from such telecommunication end points are paid for by the subscriber—whether the calls are to other company locations or not.

In summary, the needs of a dispersed family are not met with known arrangements.

SUMMARY

A solution to the above application and an advance in the art are achieved with an arrangement where a "family ring" set is established. Whereas subscribers who are members of the family ring are normally financially responsible for calls made by them (or made to them, in certain circumstances), in accordance with the principles disclosed herein, calls made to or received from another member of the family ring are paid for by a sponsor. This is achieved with the aid of a database node which maintains information about the identity of the members in the family ring.

Operationally, in accordance with one embodiment, any member of the family ring who wishes to call another member of the family ring calls a pre-designated number that connects the calling party to a database node. The database node interacts with the calling party by first determining whether the calling party is a member of the family ring, and when the calling party is authenticated, the database node responds to information that identifies a selected called party who is also a member of the family ring. The database node performs a translation, as necessary, and informs the telecommunication network of the destination desired by the calling party. In response, the telecommunication network connects the calling party to the called party.

The family ring definition can be in terms of telephone numbers only. That is, both the called parties and the calling parties can be identified simply to telephone numbers. Alternatively, or additionally, the family ring can comprise people, regardless of the telecommunication end point from which those people make the call. In such an embodiment, the authentication is through a personal identification number (PIN), or through voice recognition (voice signature). In an arrangement where both people and telecommunication end points (communication entities) are treated as part of a family ring, the authentication process takes into account both telecommunication end points and people.

A more thorough understanding of this invention may be had by perusal of the following detailed description and the accompanying drawing where

DETAILED DESCRIPTION

Figure 1:
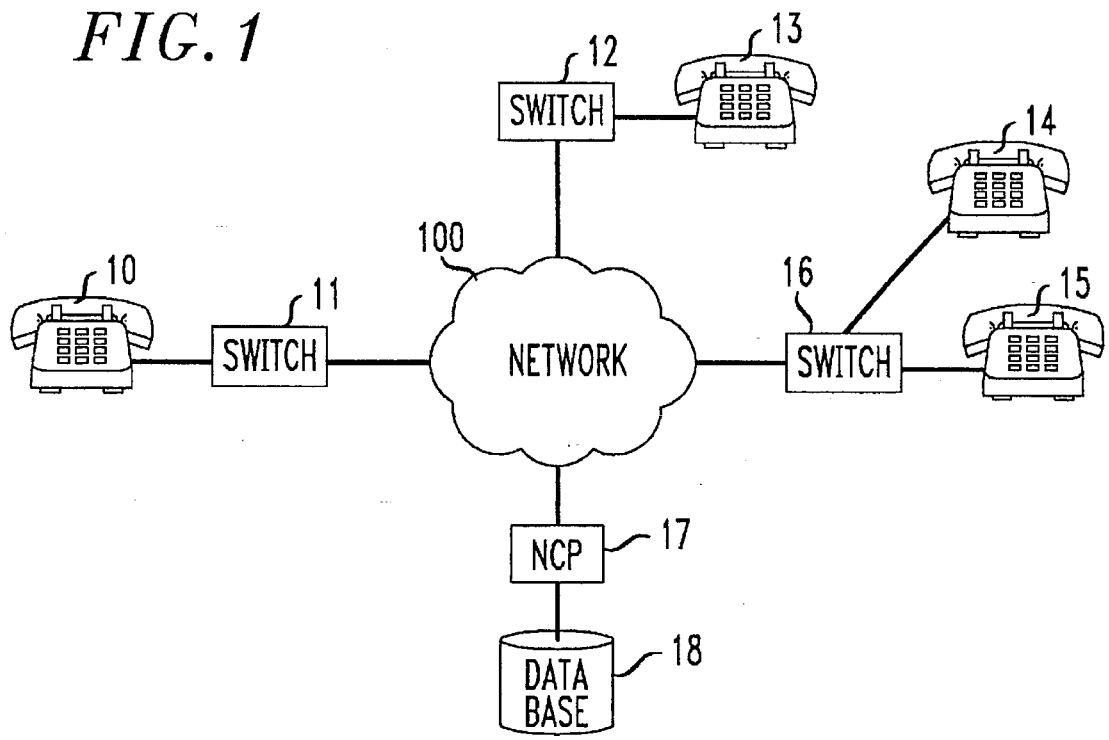
FIG. 1 presents one network arrangement for implementing the disclosed service.

FIG. 1 presents a generalized view of the telecommunication network. It includes telephone 10 connected to central office 11 which is connected to switching network 100, telephone 12 connected to central office 13 which is connected to network 100, and telephones 14 and 15 connected to central office 16 which is connected to network 100. Additionally, network control point (NCP) 17 is connected to network 100, and database 18 is associated with NCP 17. This is effectively the same arrangement that is present in the U.S. national telecommunications network for handling "800 number" calls. Telephones 10, 12, 14, and 15 are conventional telephones that belong to "normal" subscribers; i.e., subscribers that individually are responsible for the charges incurred by their telephones. They may be in different parts of the world, although telephones 14 and 15 are shown to be connected to the same switch for illustrative purposes.

When these telephones belong to a "family ring", they are associated with each other, and that association is recorded in database 18. That association is formed at the request of a "sponsor" subscriber (probably, but not necessarily a "member" of the family ring; i.e. telephone 10, 12, 14, or 15), and all charges incurred by any of the telephones in connection with "family ring" functions are charged against the telephone of the sponsor. For expository purpose, it is assumed that telephone 14 is the sponsor.

Figure 2:
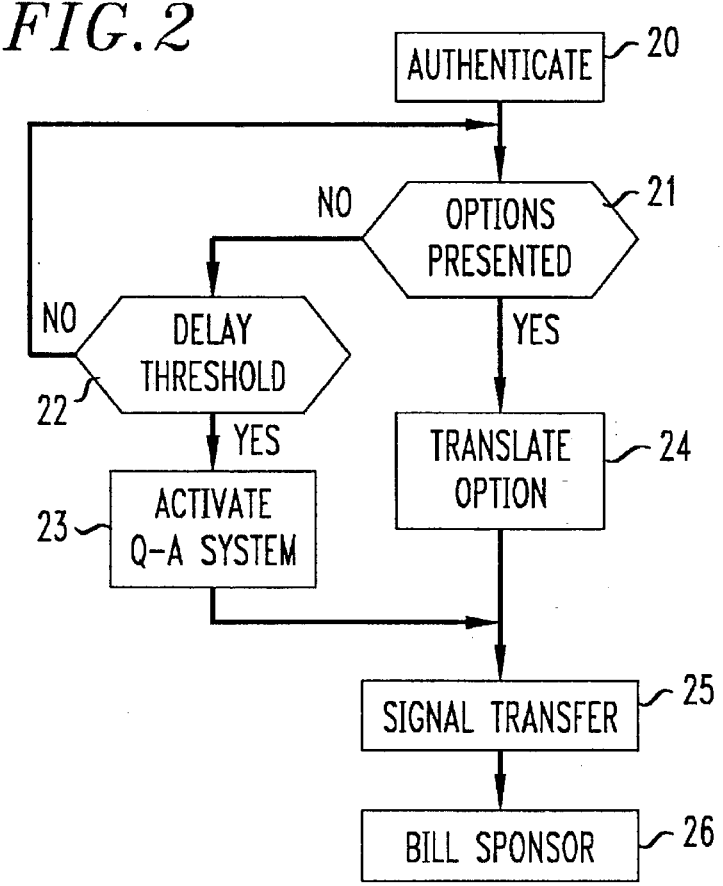
FIG. 2 is a flow chart of the method disclosed herein.

An arrangement where the family ring comprises solely telecommunication end points (such as telephones 10, 12, 14 and 15) is the simplest. Whenever telephone 10 wishes to make a call to a member of the family ring, telephone 10 places a predefined "800 number" call, and that call is directed to NCP 17. When NCP 17 is accessed with that predefined number, the call is processed in accordance with the illustrative flow chart of FIG. 2. Block 20 of the flow chart first authenticates the calling party to establish that the calling party is a member of the family ring. That is easily can be determined from the telephone number of the calling party through standard ANI processing. Blocks 21–23 then determine the particular family ring member that is the intended called party. The calling party can supply the identity of the called party together with the initial calling of the family's 800 number, or wait for a "prompt/response" session. When the calling party provides the identity of the called party immediately (such as by dialing 1-800-547-1264-3, for example, where the "3" at the end of the dialing string might designate the oldest child in the family), control passes directly from block 21 to block 24. Block 24 accesses database 18, translates the provided information (the "3", in the above example) to a telephone number of the called party, and passes control to block 25. When the called party is not identified, block 21 passes control to block 22 which inserts a short delay and returns control to block 21 to determine whether the called party has been identified. When the accumulated delay from a number of passes exceeds a preselected threshold without the information being provided, decision block 22 passes control to block 23 which engages the calling party in an interactive session to determine the identity of the intended called party. The interactive session can be the familiar voice interaction where a pre-recording presents options and asks the calling party to select one (by pressing one of the dial buttons or speaking the option number into the telephone instrument). The interactive session can also be a data communication session, when the calling party is at a telephone instrument that supports data communication. For example, should the telephone instrument used by the calling party support data communication, such as a PC or a telephone with a display, NCP 17 detects that capability and sends the available options (family ring members who could be called parties) in the form of data to the telephone instrument. The instrument displays the options to the calling party, and the calling party responds by making a selection.

To provide the necessary options, block 23 accesses database 18 and retrieves the identities of all members of the family ring and their associated telephone numbers.

Once the tasks of either blocks 23 or 24 are accomplished, the telephone number of the intended called party is known, and block 25 causes NCP 17 to signal network 100 that the calling party should be routed to the desired called party's telephone number. Finally, block 26 causes NCP 17 to signal network 100 that the sponsor should be billed for the call.

It may be noted that family ring membership in terms of called parties must always translate to a defined, or determinable, telecommunication end point.

The most desirable extension of the family ring notion both in terms of calling party or called party is to include people, rather than (or in addition to) specific telecommunication end point that, perhaps, normally serve those people. That is, a father might designate the home phone number of a child to be included in the family ring, but he might also wish to include the child herself in the family ring, regardless of the phone from which she makes calls or the phone to which the she asked incoming calls to be directed. In such an arrangement, the authentication process is, of course, a bit different. It is common to identify people by a secret "password" or personal identification number (PIN), and that approach is viable for the disclosed arrangement. An arrangement that includes both the telecommunication end points and persons is also easily accommodated.

In such an arrangement, authentication block 20 includes a number of substeps. First, the caller ID is determined and, when that authenticates, block 20 returns a positive response and the process continues to block 21. When the caller ID does not authenticate, block 20 prompts the calling party to input his or her PIN. The prompting can be a sound, or a prerecorded message. The calling party responds by either dialing the PIN or stating it, NCP 17 processes the response and again attempts to authenticate the calling party. When the authentication is positive, the process continues to block 21.

Another extension that comports with the principles disclosed herein sets aside the use of 800 numbers. In accordance with such an extension, any agreed-upon number, having a pseudo area code can be employed. For example, the regional operating companies might decide to use a "999" pseudo area code, and adjust all central offices to intercept numbers directed to this area code. Such numbers would correspond to the "800 number" approach described above for the family rings, and the rest of the process is essentially the same as described above.

Actually, the agreed-upon number need not even have a pseudo code area. Any number that is recognized by the local switch (e.g. switch 16) as a request to access NCP 17 will do.

Yet another extension that comports with the principles disclosed herein obviates the need to call a common presented number. While a common number is useful because it allows members of the family ring to call each other without remembering a plurality of phone numbers, it is not a requirement of the invention. That is, switch 16 can be arranged to capture prefix or suffix digits (or both) that combine to inform the telecommunication system that access to NCP 17 is appropriate. Thus, for example, a calling sequence 534-1234# is interpreted by switch 16 as a call by a family ring member (telecommunication end point, or a person) to another family ring member (telecommunication end point) with the destination telephone number 543-1234. Access to NCP 17 is then effected, the calling party is authenticated and, if appropriate, the connection is made. A similar effect can be achieved with, for example, 999-534-1234, and many other variations exist which can be used and which may prove to have certain practical advantages that relate to the number of people that use the service disclosed herein.

Figure 3:
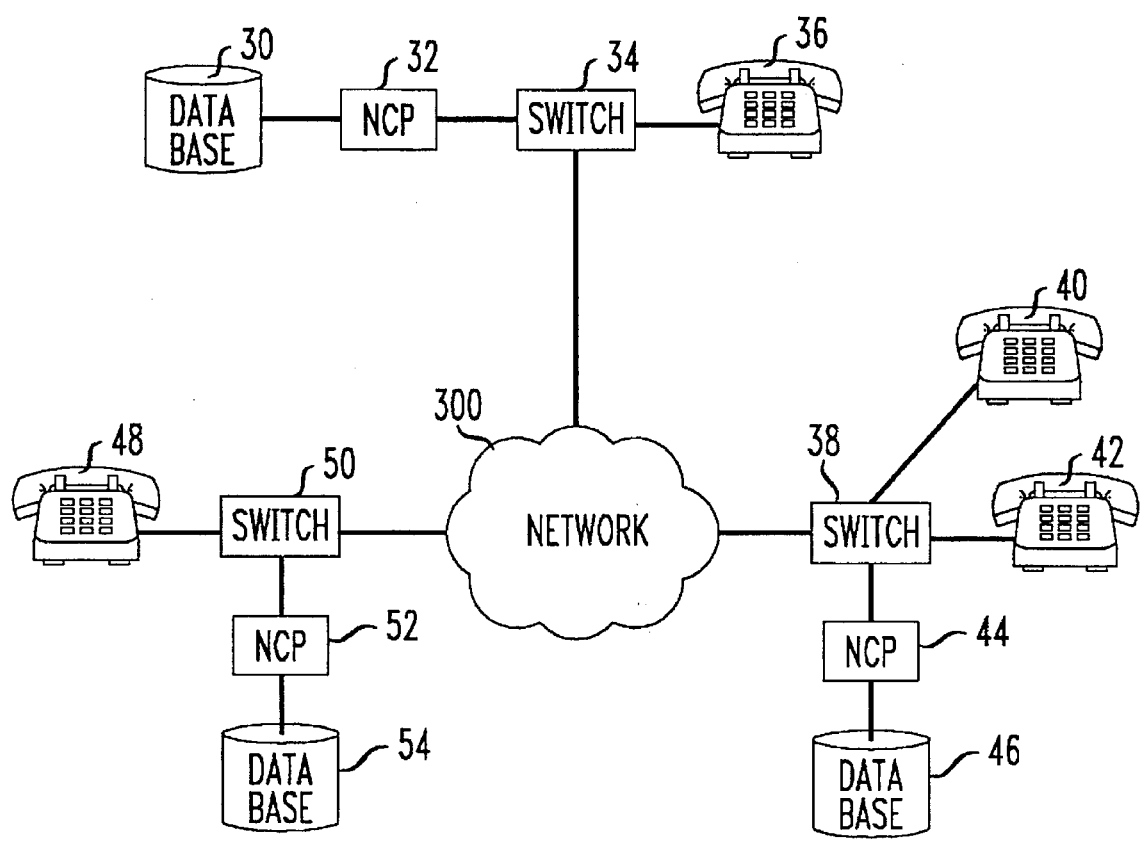
FIG. 3 depicts another network arrangement for implementing the disclosed service.

Still another extension that comports with the principles disclosed herein is depicted in FIG. 3, where NCP 17 of FIG. 1 is replaced with a number of databases that are associated with the individual central office switches. To simplify communication, each central office that services a telephone number which is a member of a family ring (as the called party) contains the data necessary for handling the expected call processing. In such an arrangement, each family ring would have its data duplicated in a number of central offices, and the calling party signaling that it is a member of a family ring is transferred to the local database.

Yet another extension takes advantage of the calling card infrastructure. A call with a card having a predefined identity is considered to be a call from an authenticated member of a family ring. Calls to other members of the family ring that use such a calling card are charged to the sponsor.

I claim:

1. A method for providing telecommunication service to a group of communication entities that are preselected by a sponsor to form a group, comprising the steps of:

in a database node, maintaining information about said communication entities that are members of said group;

based on information provided by one of said communication entities acting as a calling party, and through interaction with-to said database node, determining identity of another one of said communication entities with which the calling party wishes to communicate as a called party that is a member of said group;

effecting a connection between the calling party and the called party, and charging said sponsor for said connection instead of the entity that would be charged were it not for the fact that both calling party and called party belong to said group.

2. The method of claim 1 where said information comprises a telephone number that is unique to said group.

3. The method of claim 1 where said information comprises a telephone number that is unique to said group, followed by information that uniquely identifies one of said entities as the called party.

4. The method of claim 1 where said information comprises a telephone number that identifies the called party.

5. The method of claim 4 where said information comprises a telephone number that identifies the called party, preceded by a code.

6. The method of claim 4 where said information comprises a telephone number that identifies the called party, followed by a code.

7. The method of claim 1 further comprising a step of authenticating the calling party.

8. The method of claim 7 wherein the step of authenticating comprises determining the calling party's telephone number.

9. The method of claim 7 wherein the step of authenticating comprises determining the calling party's identity.

10. The method of claim 7 wherein the step of authenticating comprises verifying a personal identification number provided by the calling party.

11. The method of claim 10 where the personal identification number is a calling card number.

12. The method of claim 1 wherein the information provided by the calling party is a dialing sequence.

13. The method of claim 1 further comprising a step of establishing a communication path between the calling party and said database node and a step of sending an acknowledgment signal from the database node to the calling party.

14. The method of claim 13 wherein the information provided by the calling party comprises a dialed code that is sent to the database node following receipt of the acknowledgment signal.

15. The method of claim 13 wherein the information provided by the calling party comprises a spoken message that is sent to the database node following receipt of the acknowledgment signal.

16. The method of claim 1, further comprising a step of establishing a communication path between the calling party and said database node in response to a dialed sequence by the calling party.

17. The method of claim 16 where the calling party's dialing sequence includes an area code designation followed by a number.

18. The method of claim 16 where the calling party's dialing sequence includes a pseudo area code designation followed by a number.

19. The method of claim 18 where the area code is 800.

20. The method of claim 16 where the calling party's dialing sequence is a "local call" number.

21. A method for providing telecommunication service to a group of communication entities that are preselected by a sponsor, comprising the steps of:

forming a communication path between one of the communication entities (a calling party) and a predetermined one of a plurality of database nodes;

based on information provided by said calling party and information provided by the predetermined database node, determining identity of another one of said communication entities with which the calling party wishes to communicate (a called party), where it is possible that neither said calling party and said called party is said sponsor;

effecting a connection between the calling party and said called party, and assigning a charge for said connection to said sponsor.

22. The method of claim 21 Where the database node employed in the step of determining is predetermined based on the calling party.

23. The method of claim 21 where the communication entities in the group are associated with different switches of a telecommunication network.

24. A method for providing telecommunication service to a group of communication entities that are preselected by a sponsor, comprising the steps of:

maintaining, in a database; node information about said communication entities as members of said group;

based on information provided by a calling party to said database node, determining identity of another one of said communication entities with which the calling party wishes to communicate as a called party, where it is possible that neither said calling party and said called party is said sponsor where said information comprises a preselected number unique to said group;

effecting a connection between the calling party and the called party; and charging said sponsor for the connection.

* * * * *